(12) United States Patent
Donnelly et al.

(10) Patent No.: US 12,393,811 B2
(45) Date of Patent: Aug. 19, 2025

(54) SMART CARD WITH METAL INLAY ENCAPSULATING HIGH-DENSITY METAL PLUG

(71) Applicant: IDEMIA FRANCE, Courbevoie (FR)

(72) Inventors: Scott Donnelly, Exton, PA (US); Michael Reed, Exton, PA (US)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 18/084,039

(22) Filed: Dec. 19, 2022

(65) Prior Publication Data

US 2024/0202484 A1 Jun. 20, 2024

(51) Int. Cl.
*G06K 19/077* (2006.01)
(52) U.S. Cl.
CPC .............. *G06K 19/07722* (2013.01)
(58) Field of Classification Search
CPC .............................. G06K 19/07722
See application file for complete search history.

(56) References Cited

U.S. PATENT DOCUMENTS

| | | |
|---|---|---|
| 2014/0021261 A1 | 1/2014 | Mosteller |
| 2017/0017871 A1 | 1/2017 | Finn et al. |
| 2018/0204105 A1* | 7/2018 | Herslow ............ G06K 19/0723 |
| 2020/0257953 A1 | 8/2020 | Lotya et al. |
| 2021/0073608 A1* | 3/2021 | Finn ........................ B21D 5/16 |
| 2021/0081748 A1* | 3/2021 | Finn ................. G06K 19/07722 |

FOREIGN PATENT DOCUMENTS

EP 3 923 196 A1 12/2021

* cited by examiner

*Primary Examiner* — Matthew Mikels
(74) *Attorney, Agent, or Firm* — Oblon, McClelland, Maier & Neustadt, L.L.P.

(57) ABSTRACT

A metal smart card, having an inlay layer, the inlay layer including a metal card body, the metal card body defining at least one cavity in the metal card body, the at least one cavity having a continuous surface defined by an inner surface of the metal card body, a metal plug, the metal plug being housed inside the at least one cavity, an electronic component, the electronic component being housed inside the at least one cavity, and a polymer layer disposed on an outer surface of the inlay layer, the polymer layer being in contact with an outer surface of the metal plug.

19 Claims, 10 Drawing Sheets

SMART CARD WITH METAL INLAY ENCAPSULATING HIGH-DENSITY METAL PLUG

BACKGROUND

Field of the Disclosure

The present disclosure relates to the design and structure of metal smart cards.

Description of the Related Art

Metal smart cards are popular in luxury banking and other industries where it is advantageous to have a heavier and stiffer card with embedded electronic components for interaction with a card reader. Stainless steel is a standard metal for smart cards due to its manufacturability and durability. There is a need to increase the weight of a metal smart card while maintaining the size and functionality of the card and the advantages of traditional materials.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

In one embodiment, the present disclosure is related to an inlay layer of a metal smart card, comprising a metal card body, the metal card body defining at least one cavity, the at least one cavity having a continuous surface defined by an inner surface of the metal card body; a metal plug, the metal plug being housed inside the at least one cavity; and an electronic component, the electronic component being housed inside the at least one cavity.

In one embodiment, the present disclosure is related to a metal smart card, comprising an inlay layer, the inlay layer comprising a metal card body, the metal card body defining at least one cavity in the metal card body, the at least one cavity having a continuous surface defined by an inner surface of the metal card body; a metal plug, the metal plug being housed inside the at least one cavity; and an electronic component, the electronic component being housed inside the at least one cavity; and a polymer layer disposed on an outer surface of the inlay layer, wherein the polymer layer is in contact with an outer surface of the metal plug.

In one embodiment, the present disclosure is related to a method for manufacturing a metal smart card inlay, the method comprising forming a metal card body of a first metal; forming at least one cavity in the metal card body, the at least one cavity having a continuous surface defined by an inner surface of the metal card body; forming a metal plug of a second metal; depositing the metal plug in the at least one cavity in the metal card body; and depositing an electronic component in the at least one cavity in the metal card body.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompany descriptions, wherein.

DETAILED DESCRIPTION

Figure 1A:
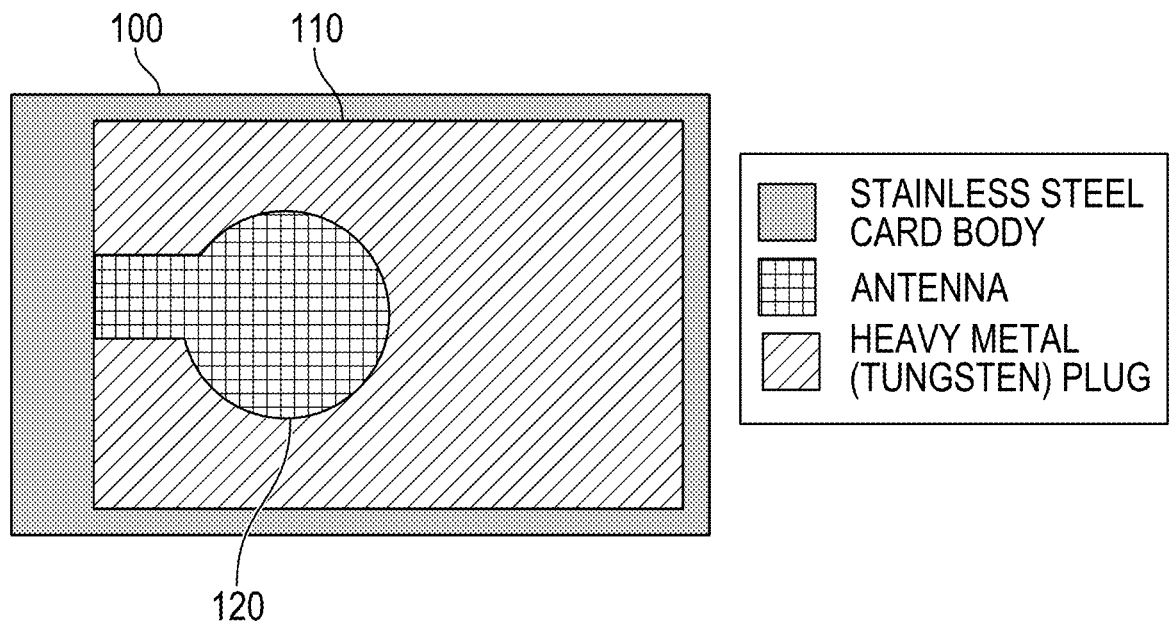
FIG. 1A is an assembled metal card body, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Smart cards can be used to digitally provide data to be read by a device. Examples of smart cards can include, but are not limited to, credit/debit cards, identification cards, transportation cards, calling cards, and access cards. The information provided on the card can be stored or accessed by an integrated circuit (IC) embedded in the card. The IC can include a microcontroller or similar processor and memory storage. The IC can be configured for data storage and retrieval, encryption, authentication, and other functions necessary for data transfer and authentication. The device interacting with the card can be a reader equipped to scan or read a smart card and initiate data transfer with the smart card. The scanning or reading can include scanning of a magnetic strip or contact with a chip embedded in the card body. Contactless readers are increasingly popular. Smart cards can include an antenna embedded within the card body to enable contactless data transfer between the integrated circuit of the chip and the reader. The contactless data transfer can be initiated by an inductive coupling, such as in near-field communication (NFC) protocols.

Smart cards can be composed of layers of material to enclose an IC and additional electronic components for data storage and transfer. In addition, smart cards typically include a design or art layer for visual and informational purposes. There are many considerations in the design and manufacture of smart cards. For example, durability, safety, performance, compliance with institutional standards, cost, material usage, ease of manufacturing, appearance, and tactile feel are all factors that affect how smart cards are made. Desired properties of a smart card can depend on the use of the card. For example, cards that are carried and used regularly, such as credit cards, should be durable and resistant to corrosion or breakage while providing the necessary functionality. Cards are also designed and manufactured to comply with standards from the International Organization for Standardization (ISO) regarding the dimensions of the cards and transmission protocols for relevant industries.

In certain industries, there is a need to increase the weight of a smart card while maintaining card functionality and desired characteristics such as durability, machinability, and standards compliance. For example, metal credit cards (or similar payment cards) are used in luxury banking for their aesthetic appeal. Metal credit cards are, by nature, heavier than plastic credit cards, and the additional weight can have implications for branding and marketing. Heavy credit cards can have different visual and tactile properties that distinguish them from lighter cards; for example, a heavier card will be louder when the card contacts a hard surface such as a card reader. Stainless steel is commonly used in metal smart cards due to its corrosion resistance, rigidity, low magnetic permeability, machinability, and industrial availability. However, there is a limit to how heavy a stainless steel card can be while still complying with the standard size and functionality of a smart card. Increasing the thickness of a stainless steel card in order to increase the weight of the card may not be desirable in the luxury card market as a noticeably large card can be impractical or unappealing. There are a number of metals and metal alloys that are denser than stainless steel. However, these metals may not have the properties of stainless steel that are advantageous for smart card manufacturing or may have adverse properties such as reactivity or shielding. Machining metal cards with heavier alloys that are not typically used in mass manufacturing can also pose challenges. There is therefore a need to design and manufacture heavier metal smart cards that can be easily manufactured and that are as durable, or more durable, than uniform stainless steel metal cards. As an example, a heavier metal card can be designed with a desired weight of at least 20 grams (g) compared to the typical weight of 13.5 g for most metal cards.

In one embodiment, the present disclosure is directed to a smart card with a metal plug embedded in the body of the card and a manufacturing method thereof. The metal plug can be a heavy metal plug and can be denser than the surrounding metal composing the body of the card. According to one example, the metal plug can be embedded in metal card body, wherein the metal of the plug is heavier or denser than the metal of the surrounding card body. The metal card body, including the plug, can form the core of the metal card and can be encapsulated by resin or other substrates. The metal card body can also include electronic components, including an antenna, an integrated circuit, and/or any other circuitry used for card scanning functionalities. The antenna can be incorporated into the metal card body along with the metal plug in a way that does not impede the functionality of the card or expose the electronic components to points of failure. According to some implementations, the metal plug and the antenna can be incorporated into the metal card body and allow for contactless reading within a proximity of the metal card body. A smart card can include one or more circuit components, including, but not limited to, the antenna, a microprocessor, data storage, or other integrated circuit chips. In one embodiment, the antenna can be a first circuit component enabling data transfer between a smart card and a reader. The antenna can be incorporated along with the metal plug into the metal card body. Additional circuit components can be embedded into the metal card body throughout the manufacturing process, including after a card has been assembled and separated from a sheet of cards. The additional circuit components can be embedded in different locations throughout the metal card body. The metal plug and the antenna placement do not affect the placement of the additional circuit components in the metal smart card. Additionally or alternatively, the antenna can include the one or more circuit components, including a microprocessor, data storage, or other integrated circuitry, in a single integrated circuit chip, wherein the chip can be embedded in the card. The description of the antenna throughout this disclosure can refer to a separate antenna component and/or an antenna that is integrated or combined with additional smart card circuitry known to one of ordinary skill in the art. A variety of configurations and geometries of the metal card body, the plug, and the circuitry can be compatible with the present disclosure and will be disclosed as non-limiting embodiments herein. It can be desirable in certain implementations to manufacture a fully metal card, without a plastic border or any plastic edges along the perimeter of the card. In certain embodiments, the metal card body surrounding the metal plug can protect the metal plug from corrosion and exposure to handling while maintaining a fully metal card and finish.

According to some embodiments, the metal card body can be a stainless steel body or other machine-able metal, and the metal plug can be a tungsten (W) plug. Tungsten is one of the heaviest commercially available metals, with a density of 19.28 g/cm$^3$ compared to that of stainless steel (approximately 8 g/cm$^3$). In certain embodiments, the tungsten plug can be a tungsten alloy. For example, tungsten can be alloyed with nickel, copper, and iron, or other non-radioactive metals. For illustrative purposes, metal smart cards incorporating a tungsten plug and a stainless steel card body will be described herein. However, it can be appreciated that alternative and additional metals can be used for the metal card body and the metal plug of the present disclosure. For example, the metal plug can be titanium. Various families of stainless steel and similar alloys can be used for the metal card body. In selecting metals, it can be advantageous for the metal plug to be denser than the metal card body to achieve the desired weight of the smart card. In some embodiments, the metal card body can be denser than the metal plug. The combination of metals in the smart card can achieve the desired weight of the smart card while maintaining or improving machinability.

In some embodiments, the tungsten plug can be a sheet or card of tungsten embedded in a cavity in the stainless steel card body. In one embodiment, the tungsten plug can be approximately rectangular in shape. The cavity can be sized to the shape and dimensions of the tungsten plug to prevent any movement of the tungsten plug within the cavity. The tungsten plug can be located anywhere within the metal card body. As previously described, it can be advantageous to fully encapsulate the tungsten plug within the metal card body such that the edges of the tungsten plug are not exposed at the edges of the metal card body. Thus, the cavity in the metal card body can be fully contained in the metal card body and may not be contiguous with the edges of the metal card body. The edges of a smart card are vulnerable to wear from everyday handling and contact with other surfaces or materials. Surrounding the tungsten plug completely with stainless steel can protect the plug from corrosion while maintaining the fully metal feel of the card. In addition, the stainless steel card body can still be manufactured in the typical shape and dimensions of a smart card (e.g., a rectangle) as a first step in assembling the metal card body. Furthermore, embedding the metal plug in a metal card body can result in a more durable metal card because the metal plug and the metal card body are relatively similar in strength and flexibility. In contrast, embedding a metal plug in a plastic card body can weaken the integrity of the card as a whole. A metal plug would be stiffer than the surrounding plastic and can puncture or rip through the plastic when pressure is applied to bend the card. According to some embodiments, the shape of the tungsten plug can be dependent on the shape and positioning of the antenna and other circuitry in the metal card body, as will be described in further detail herein. According to some embodiments, the cavity can be a through hole inside the metal card body.

FIG. 1A is an illustration of a metal plug 110 and an antenna 120 embedded in a metal card body 100, according to one embodiment of the present disclosure. The metal card body 100 can form the body of the smart card. The metal card body 100 can be approximately rectangular with rounded corners. Exemplary card and component dimensions are presented herein as non-limiting, illustrative embodiments. In one embodiment, the metal card body 100 can be approximately 85.928 mm in width and 54.331 mm in height. In one embodiment, the metal plug 110 can be a tungsten or other heavy metal plug and the metal card body 100 can be stainless steel, as indicated in the legend. In one embodiment, the antenna 120 can include any circuitry used for smart card functionality, including, but not limited to, processing circuitry and memory. A cavity can be made in the metal card body 100 to fully contain and encapsulate the metal plug 110. In one embodiment, the cavity can be fully contained in the metal card body 100 such that the surface of the cavity is discontinuous with the edges of the metal card body 100. The metal plug 110 does not touch the edges of the metal card body 100 when placed in the cavity that is fully contained in the metal card body 100. In one embodiment, the surface of the cavity can be continuous with one or more edges of the metal card body 100 such that the metal plug 110 is in contact with one or more edges of the metal card body 100 when placed in the cavity. In some embodiments, the cavity can include space for the antenna 120. The metal plug 110 can take up any portion of the area of the metal card body 100. In one embodiment, the cavity can be made in a first outer surface (e.g., the top surface) of the metal card body such the metal plug 110 can be exposed at the top surface of the metal card body 100 when the metal plug 110 is placed in the cavity. In some embodiments, the cavity can be a through hole cutout through the first outer surface (e.g., the top surface) and the opposing second outer surface (e.g., the bottom surface) of the metal card body 100 such that the metal plug 110 can be exposed at the top surface and the bottom surface of the metal card body 100 when the metal plug 110 is placed in the cavity. In some implementations, the metal plug design of FIG. 1A can result in an even distribution of the weight of the heavy metal across the card.

In one embodiment, the metal plug 110 can fully encapsulate and contain the antenna 120, as shown in FIG. 1A. The metal plug 110 can include an antenna cutout, wherein the antenna 120 can fit into the antenna cutout. The antenna 120 can be surrounded by the heavy metal of the metal plug 110. An edge of the antenna 120 can be flush with an edge of the metal plug 110, as illustrated in FIG. 1A, such that the antenna 120 is contained within the metal plug 110. In one embodiment, the metal plug 110 can surround the antenna 120 and extend past the antenna 120. The antenna 120 can be placed in any position and orientation within the metal plug 110. According to embodiments, the antenna 120 can be placed in the metal card body 100 such that the antenna is exposed at the top surface and the bottom surface of the metal card body. The exposure of the antenna 120 on both sides of the metal card body can provide improved reception for wireless data transmission.

Figure 1B:
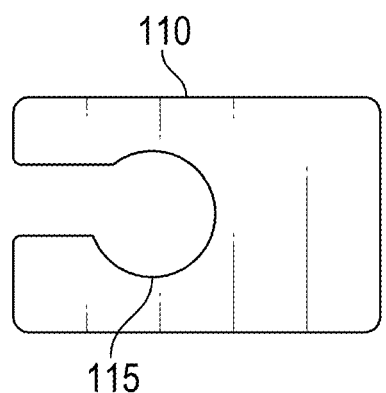
FIG. 1B is a heavy metal plug, according to an exemplary embodiment of the present disclosure.

FIG. 1B is an illustration of the metal plug 110, according to one embodiment of the present disclosure. The metal plug 110 of FIG. 1B can be used in the card body design of FIG. 1A. According to the illustrated example, the metal plug 110 can be approximately rectangular with rounded corners. According to one example, the metal plug 110 can be approximately 74.656 mm in width and approximately 47.831 mm in height. The radius of the rounded edges can be approximately 2.750 mm. Alternative shapes and geometries of the metal plug 110 are compatible with the present disclosure. In some embodiments, the design of FIG. 1A can maximize the amount of heavy metal used in the card as the metal plug 110 can take up a majority of the surface area of the metal card body. According to one embodiment, the metal plug 110 can include an antenna cutout 115 for placement of the antenna. The metal plug 110 of FIG. 1A and FIG. 1B can fully encapsulate the antenna. Thus, the antenna cutout 115 can be in the shape of the antenna and can be machined to the dimensions of the antenna. For example, the antenna cutout 115 can include a rounded portion with a radius of approximately 12.921 mm and a rectangular portion according to the shape of the antenna. The cutout can be a symmetrical shape or can be asymmetrical depending on the shape of the antenna. For example, a first edge of the cutout can extend past an opposite edge. The antenna can be centered in the metal plug 110 or can be positioned anywhere within the metal plug 110. According to one embodiment, an edge of the antenna cutout 115 or a portion of the perimeter of the antenna cutout 115 can be aligned with an edge of the metal plug 110, as illustrated in the example of FIG. 1B. In one embodiment, the metal plug 110 can be in contact with the portion of the antenna 120 that is encapsulated by the metal plug. In one embodiment, the entire antenna can be enclosed within the metal plug, and the metal plug can be a closed rectangle. The antenna cutout 115 can be cut through the metal plug 110 such that the top surface of the antenna and the bottom surface of the antenna are exposed when the antenna is placed in the antenna cutout 115. According to one embodiment, the thickness of the metal plug can be approximately 0.305 mm.

Figure 2A:
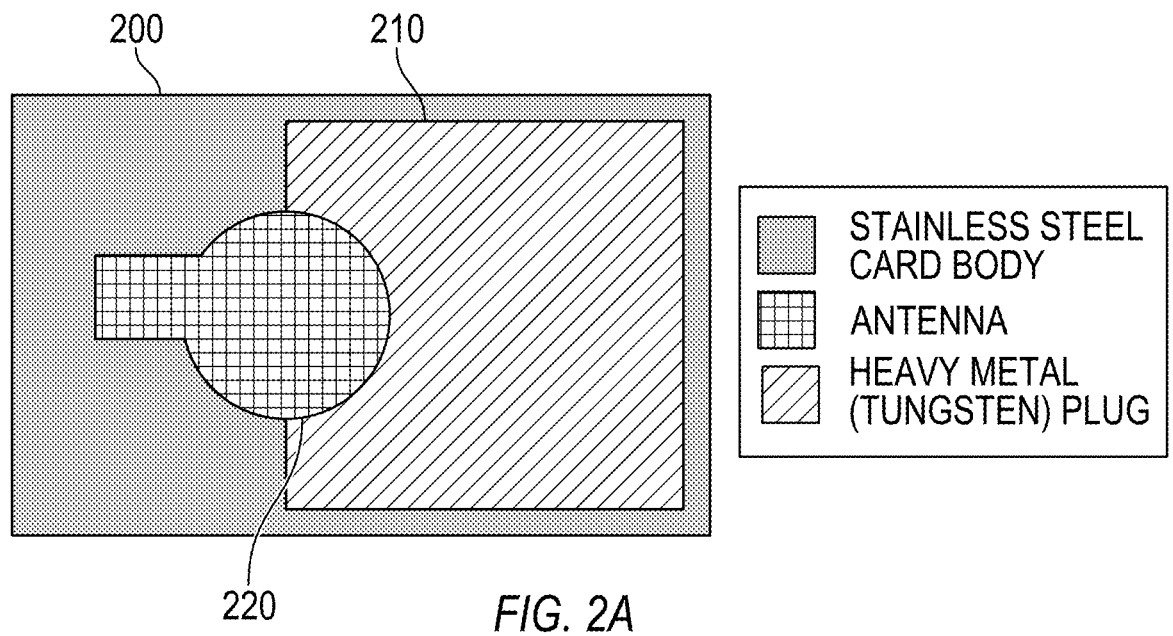
FIG. 2A is an assembled metal card body, according to an exemplary embodiment of the present disclosure.

FIG. 2A is an illustration of a metal plug 210 and an antenna 220 embedded in a metal card body 200 according to one embodiment of the present disclosure. The metal card body 200 can form the body of the smart card. The metal card body 200 can be approximately rectangular with rounded corners. Exemplary card and component dimensions are presented herein as non-limiting, illustrative embodiments. In one embodiment, the metal card body 200 can be approximately 85.928 mm in width and 54.331 mm in height. In one embodiment, the metal plug 210 can be a tungsten or other heavy metal plug and the metal card body 200 can be stainless steel, as indicated in the legend. In one embodiment, the antenna 220 can include any circuitry used for smart card functionality, including, but not limited to, processing circuitry and memory. A cavity can be made in the metal card body 200 to fully contain and encapsulate the metal plug 210. In one embodiment, the cavity can be fully contained in the metal card body 200 such that the surface of the cavity is discontinuous with the edges of the metal card body 200. The metal plug 210 does not touch the edges of the metal card body 200 when placed in the cavity that is fully contained in the metal card body 200. In one embodiment, the surface of the cavity can be continuous with one or more edges of the metal card body 200 such that the metal plug 210 is in contact with one or more edges of the metal card body 200 when placed in the cavity. In some embodiments, the cavity can include space for the antenna 120. The metal plug 210 can take up any portion of the area of the metal card body 200. In one embodiment, the cavity can be made in a first outer surface (e.g., the top surface) of the metal card body such that the metal plug 210 can be exposed at the top surface of the metal card body 200 when the metal plug 210 is placed in the cavity. In some embodiments, the cavity can be a cutout through the first surface (e.g., the top surface) of the metal card body 200 and the opposing second outer surface (e.g., the bottom surface) of the metal card body 200 such that the metal plug 210 can be exposed at the top surface and the bottom surface of the metal card body when the metal plug is placed in the cavity. According to embodiments, the antenna 220 can be placed in the metal card body 200 such that the antenna is exposed at the top surface and the bottom surface of the metal card body. The exposure of the antenna 220 on both sides of the metal card body can provide improved reception for wireless data transmission.

In one embodiment, the metal plug 210 can partially encapsulate the antenna 220, as illustrated in FIG. 2A. The metal plug 210 can include an antenna cutout, wherein a portion of the antenna 220 can fit into the cutout of the metal plug 210. A portion of the antenna 220 can be surrounded by the metal plug 210. In one embodiment, the metal plug 210 can be in contact with the portion of the antenna 220 that is partially encapsulated by the metal plug. The remaining portion of the antenna can extend past the metal plug 210 and be embedded directly in the metal card body 200. The antenna 220 is partially constrained by the metal plug 210 and partially constrained by the metal card body 200. Advantageously, the partial encapsulation of the antenna 220 can maximize the metal plug material for the given area while ensuring that each component is fully constrained.

Figure 2B:
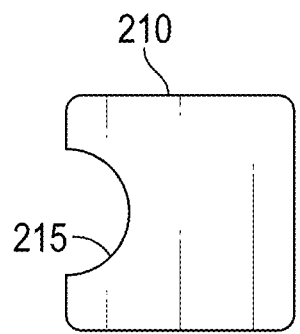
FIG. 2B is a heavy metal plug, according to an exemplary embodiment of the present disclosure.

FIG. 2B is an illustration of the metal plug 210, according to one embodiment of the present disclosure. The metal plug 210 of FIG. 2B can be used in the card body design of FIG. 2A. According to the illustrated example, the metal plug 210 can be approximately rectangular with rounded corners. The radius of the rounded edges can be approximately 2.750 mm. In one embodiment, the metal plug 210 can be approximately 45.281 mm in width and approximately 47.831 mm in height. Alternative shapes and geometries of the metal plug 210 are compatible with the present disclosure. According to one embodiment, the metal plug 210 can include an antenna cutout 215 for placement of the antenna. The metal plug 210 of FIG. 2A and FIG. 2B can partially encapsulate the antenna. The antenna cutout 215 can be in the shape of a portion of the antenna. For example, the antenna cutout 215 can be a rounded cutout to fit around a rounded portion of the antenna, as illustrated in FIG. 2B. In one embodiment, the radius of the curve of the cutout 215 can be approximately 12.921 mm. The cutout 215 can be approximately symmetrical or can be asymmetrical. For example, a first edge of the cutout 215 can extend past an opposing edge. In one embodiment, the geometry of the antenna cutout 215 can be designed to minimize manufacturing time. For example, the antenna cutout 215 can be shaped for easy placement of the antenna within the cutout. The antenna cutout 215 can be centered along any dimension of the metal plug 210 or can be positioned anywhere within the metal plug 210. The antenna cutout 215 can be cut through the metal plug 210 such that the antenna is exposed at the top surface and the bottom surface of the metal plug when the antenna is placed in the antenna cutout 215. According to one embodiment, the metal plug can be approximately 0.305 mm in thickness.

Figure 3A:
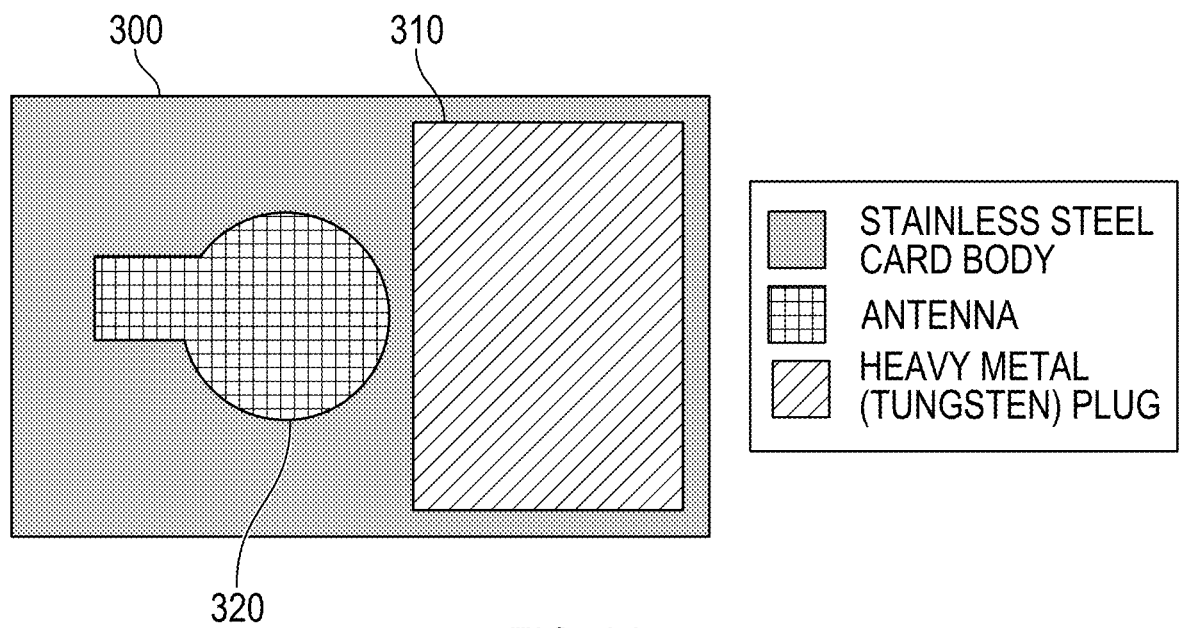
FIG. 3A is an assembled metal card body, according to an exemplary embodiment of the present disclosure.

FIG. 3A is an illustration of a metal plug 310 and an antenna 320 embedded in a metal card body 300 according to one embodiment of the present disclosure. The metal card body 300 can form the body of the smart card. The metal card body 300 can be approximately rectangular with rounded corners. Exemplary card and component dimensions are presented herein as non-limiting, illustrative embodiments. In one embodiment, the metal card body 300 can be approximately 85.928 mm in width and 54.331 mm in height. In one embodiment, the metal plug 310 can be a tungsten or other heavy metal plug and the metal card body 300 can be stainless steel, as indicated in the legend. In one embodiment, the antenna 320 can include any circuitry used for smart card functionality, including, but not limited to, processing circuitry and memory. A cavity can be made in the metal card body 300 to fully contain and encapsulate the metal plug 310. In one embodiment, the cavity can be fully contained in the metal card body 300 such that the surface of the cavity is discontinuous with the edges of the metal card body 300. The metal plug 310 does not touch the edges of the metal card body 300 when placed in the cavity that is fully contained in the metal card body 300. In one embodiment, the surface of the cavity can be continuous with one or more edges of the metal card body 300 such that the metal plug 310 is in contact with one or more edges of the metal card body 300 when placed in the cavity. In some embodiments, the cavity can include space for the antenna 320. The metal plug 310 can take up any portion of the area of the metal card body 300. In one embodiment, the cavity can be made in a first outer surface (e.g., the top surface) of the metal card body such the metal plug 310 can be exposed at the top surface of the metal card body 300 when the metal plug 310 is placed in the cavity. In some embodiments, the cavity can be a cutout through the first surface (e.g., the top surface) of the metal card body 300 and the opposing second outer surface (e.g., the bottom surface) of the metal card body 300 such that the metal plug can be exposed at the top surface and the bottom surface of the metal card body 300 when the metal plug is placed in the cavity. In one embodiment, the antenna 320 can be placed in the metal card body 300 such that the antenna is exposed at the top surface and the bottom surface of the metal card body. The exposure of the antenna 320 on both sides of the metal card body can provide improved reception for wireless data transmission.

In one embodiment, the metal plug 310 can be separate from the antenna 320 in the metal card body 300, as illustrated in FIG. 3A. The metal card body 300 can include a first cavity for the metal plug 310 and a second cavity for the antenna 320. The metal plug 310 and the antenna 320 can be positioned in the metal card body 300 such that the two components are not in contact with each other. The metal plug 310 and the antenna 320 can each be independently constrained by the metal card body 300. The size and geometry of the metal plug 310 can depend on the size and geometry of the antenna 320. In some implementations, the separation between the metal plug 310 and the antenna 320 can result in the most efficient use of heavy metal in the metal plug 310 because the metal plug 310 does not include any material cutouts. The more uniform shape of the metal plug 310 in the exemplary design of FIG. 3A can reduce manufacturing time and costs.

Figure 3B:
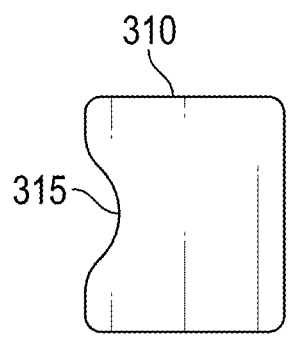
FIG. 3B is a heavy metal plug, according to an exemplary embodiment of the present disclosure.

FIG. 3B is an illustration of the metal plug 310, according to one embodiment of the present disclosure. The metal plug 310 of FIG. 3B can be used in the card body design of FIG. 3A. According to the illustrated example, the metal plug 310 can be approximately rectangular with rounded corners. The radius of the rounded edges can be approximately 2.750 mm. In one embodiment, the metal plug 310 can be approximately 34 mm in width and approximately 47.831 mm in height. Alternative shapes and geometries of the metal plug 310 are compatible with the present disclosure. According to one embodiment, the metal plug 310 may not include an antenna cutout because the metal plug 310 can be positioned separate from the antenna. According to one embodiment, the metal plug can include a curvature 315 to fit around the antenna. The radius of the curvature 315 can be, for example, approximately 15.671 mm. The curvature 315 can enable the metal plug and the antenna to be positioned in close proximity without overlap or contact between the metal plug and the antenna. According to one embodiment, the metal plug can be approximately 0.305 mm in thickness.

According to one embodiment, the antenna can be a perimeter antenna placed in proximity to one or more edges of the metal card body. For example, the antenna can be a length of circuitry positioned along any length of the perimeter of the metal card body. In some embodiments, the perimeter antenna can be placed near the edges of the metal card body but not directly at the edges of the metal card body. The metal card body (e.g., the stainless steel card body) can still compose the edges of the smart card to ensure the durability of the smart card. The perimeter antenna can enable different configurations and proximities for reading of a smart card. In one embodiment, the perimeter antenna can surround the metal plug. For example, the metal plug can be a rectangular plug. The metal plug can be placed in a cavity in the metal card body and the perimeter antenna can be positioned around the metal plug. In one embodiment, the perimeter antenna can be in contact with the metal plug and can form a border of the metal plug. In one embodiment, there can be separation between the metal plug and the perimeter antenna. In one embodiment, the metal plug can include a cutout for placement of the perimeter antenna. For example, the metal plug can include a cutout in the shape of a rectangular outline. The perimeter antenna can be fully or partially encapsulated by the metal plug.

Advantageously, any of the cards described herein can be manufactured with a variety of antennae and chip designs and standards. The illustrative examples provided in the present disclosure make clear a number of positions and relationships between the metal card body, the heavy metal plug, and the antenna. These positions can be implemented with a variety of metal card body shapes, metal plug shapes, and antenna shapes and sizes. For example, a circular metal plug can fully encapsulate or partially encapsulate an antenna. According to one embodiment, any of the cards disclosed herein can be compatible with more than one antenna or circuit module. For example, a metal card body and/or a metal plug can include more than one cutout for more than one antenna. In one embodiment, a metal card body can include more than one metal plug. For example, an antenna can be positioned in the center of the metal card body. A first metal plug can be positioned on a first side of the antenna and a second metal plug can be positioned on a second side of the antenna.

Figure 4:
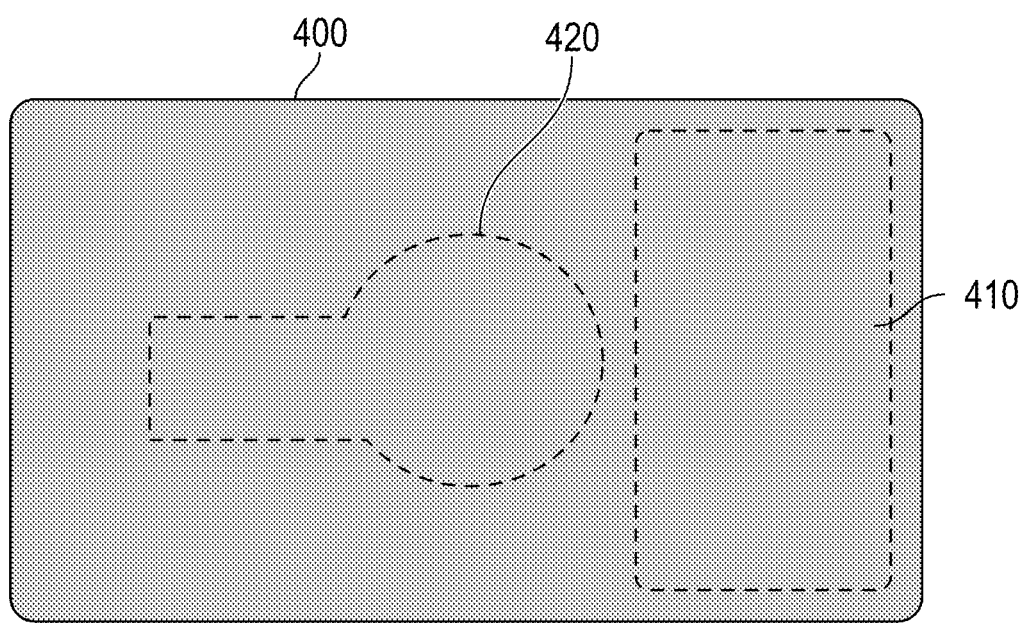
FIG. 4 is a metal card body, according to an exemplary embodiment of the present disclosure.

FIG. 4 is an illustration of a metal card body 400 with a first cavity 410 for a metal plug and a second cavity 420 for an antenna, according to one embodiment of the present disclosure. In the exemplary illustration, the metal plug and the antenna can be positioned in the metal card body 400 with a separation between the two components, as in FIG. 3A and FIG. 3B. In some embodiments, the first cavity 410 and the second cavity 420 can be combined into a single cavity in the metal card body, as when the metal plug fully encapsulates or partially encapsulates the antenna. According to one embodiment, the metal card body 400 can be cut into a metal foil or sheet, e.g., a stainless steel foil. For example, a number of card bodies can be cut into a metal foil in one laser cutting process. The foil can include, for example, 48 card bodies and can be further processed as a single sheet before the individual card bodies are separated from the foil. In one embodiment, at least one cavity can be chemically etched into the metal card body 400. Chemical etching can involve using a light-sensitive photoresist to transfer a pattern onto the metal card body 400. Chemical etching can be used to create precise cavities in a highly repeatable manner without placing mechanical stress on the metal card body 400. The depth of the cavity can be modulated by the chemical etching process. In an embodiment, the thickness of the metal plug can be approximately the same as the thickness of the metal card body. The metal plug can sit flush against the top surface and bottom surface of the metal card body when the metal plug is placed in the cavity 410. In one embodiment, the thickness of the antenna can be approximately the same as the thickness of the metal card body.

Figure 5:
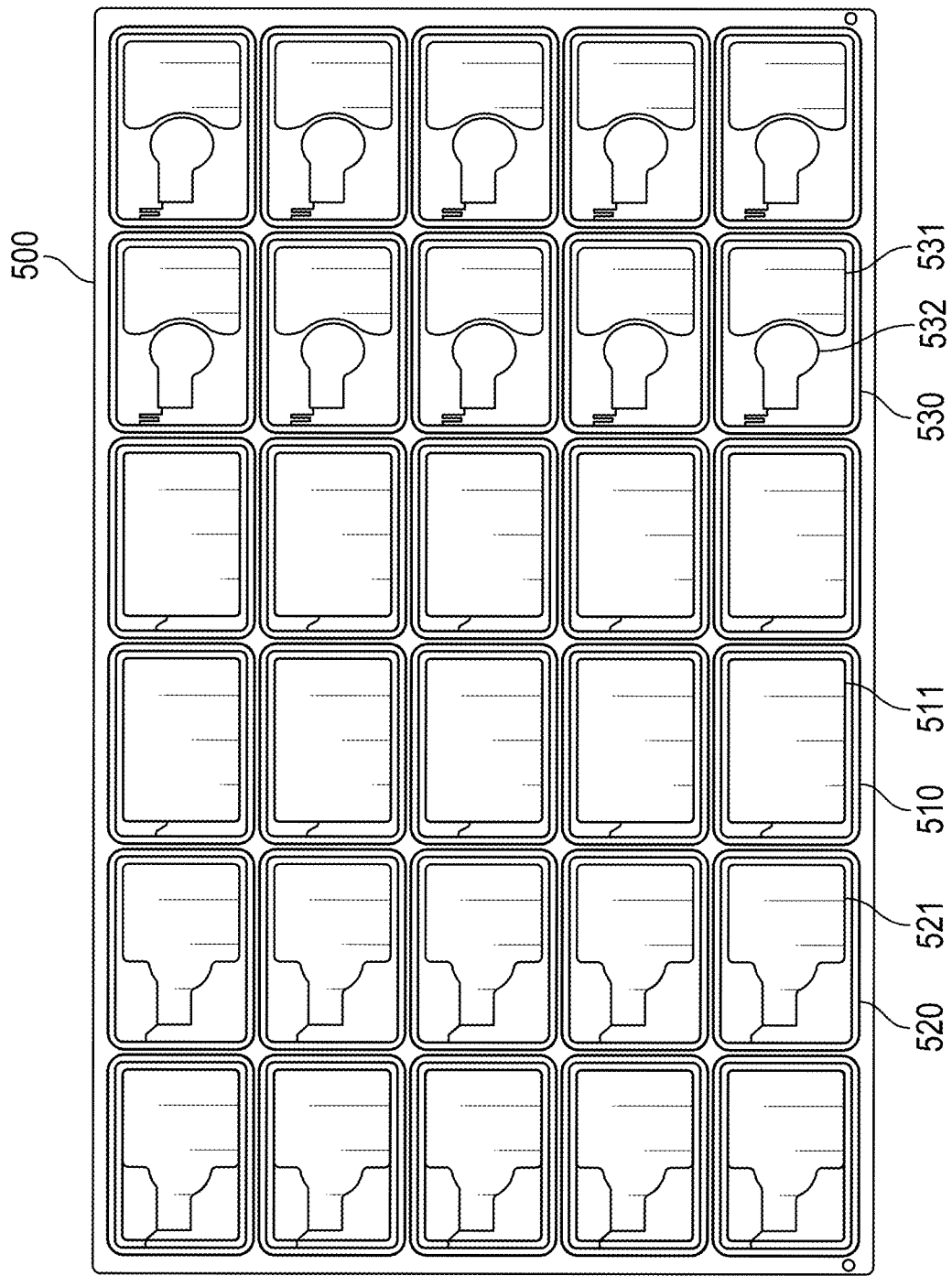
FIG. 5 is a sheet of metal card bodies, according to an exemplary embodiment of the present disclosure.

FIG. 5 is an illustration of a metal foil or sheet 500 with multiple card bodies, according to one embodiment of the present disclosure. In one embodiment, the metal sheet 500 can be a stainless steel sheet, as has been discussed herein. The metal sheet 500 can be cut and etched to create multiple card bodies, e.g., 30 card bodies as illustrated in FIG. 5. As an exemplary embodiment, the sheet 500 can be approximately 590.5 mm in width and 191.1 mm in height. In one embodiment, each card body can be surrounded by a border. The border can be a separation between card bodies to facilitate assembly and can form a boundary for singulation or separation of the card bodies from the sheet after assembly. In one embodiment, the metal sheet 500 can be used to create more than one card body design. For example, the metal sheet 500 can include card bodies 510 for a metal plug fully encapsulating an antenna, card bodies 520 for a metal plug partially encapsulating an antenna, and card bodies 530 for a metal plug positioned separately from an antenna. The cavities for each of the card body designs can be chemically etched into each of the card bodies 510, 520, 530. For example, a single cavity 511 in the shape of a metal plug can be chemically etched into each card body 510. The single cavity 511 can contain a metal plug fully encapsulating an antenna. In one exemplary design, a cavity 521 can be chemically etched into each card body 520. The cavity 521 can contain a metal plug and an antenna, wherein the metal plug is partially encapsulating an antenna. In one exemplary design, a first cavity 531 and a second cavity 532 can be chemically etched into each card body 530. The first cavity 531 can contain a metal plug, and the second cavity 532 can contain an antenna. The first cavity 531 and the second cavity 532 can be chemically etched with a separation between the first cavity 531 and the second cavity 532. The separation between the first cavity 531 and the second cavity 532 can be contrasted with the partial encapsulation design of card body 520, in which the metal plug and the antenna can fit into a single cavity 521. Exemplary dimensions of the metal sheet 500 and each of the card bodies 510, 520, 530 are shown in FIG. 5. Each of the card bodies 510, 520, 530 can be rectangular with rounded edges. In one embodiment, the card bodies can be uniformly spaced across the metal sheet 500 with the same separation between each card body. Each card body can have the same dimensions or at least one dimension (e.g., a height, a width) in common. A metal sheet 500 can be used for a single card body design or more than one card body design.

Figure 6A:
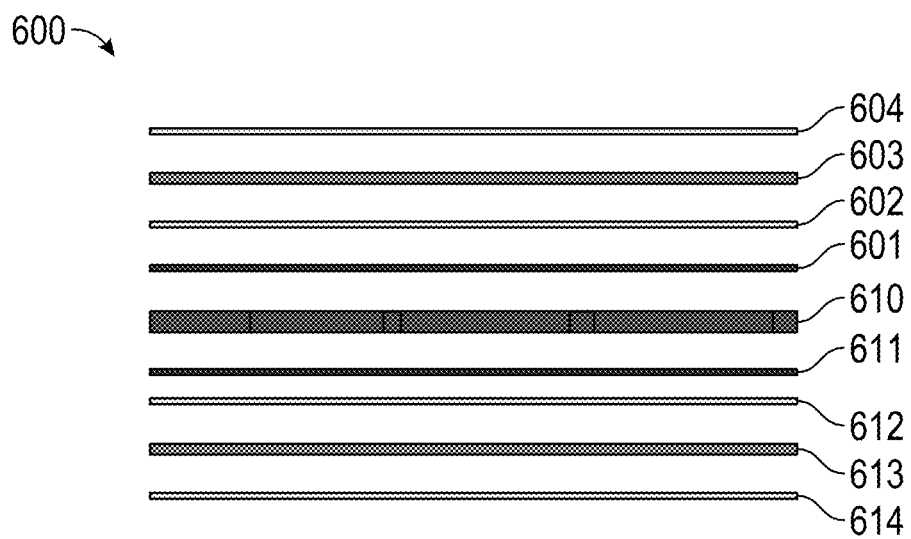
FIG. 6A is an exploded view of a metal smart card, according to an exemplary embodiment of the present disclosure.

FIG. 6A is a lateral exploded view of a fully assembled metal smart card 600 according to an exemplary embodiment of the present disclosure. The metal smart card 600 can include the metal card body 610. The metal card body 610 can be a stainless steel body. The metal card body 610 can form the core of the metal smart card 600. In one embodiment, the smart card 600 can include at least one binder layer 601 and at least one polymer layer 602 on top of the at least one binder layer 601 on top of the metal card body 610. In one embodiment, the smart card 600 can include at least one binder layer 611 and at least one polymer layer 612 on the bottom of the smart card. In one embodiment, the binder layers 601, 611 can be resin layers. The resin can be a curable resin, including, but not limited to, ester group resins, acetal resins, casting resins, impregnated resins, unsaturated resins, saturated resins, urethane acrylate, silicone acrylate, epoxy acrylate, methacrylate, acrylate, or urethane. In one embodiment, the binder layer can be an adhesive layer. In one embodiment, the polymer layers 602, 612 can be polyvinyl chloride (PVC) or an epoxy-based compound. In one embodiment, the binder layers and polymer layers can be totally or partially transparent. According to one embodiment, the smart card 600 can further include a top art layer 603 and a top overlay layer 604 on top of the polymer layer 602. The top art layer 603 and/or the top overlay layer 604 can be totally or partially transparent to reveal the inner metal components. The top art layer 603 can include, in some examples, designs such as a logo or identifying information related to the card issuer or cardholder. In one embodiment, the smart card 600 can include a bottom art layer 613 and a bottom overlay layer 614 over the polymer layer 612 on the bottom of the smart card. Each layer can be a rectangular layer with rounded edges of approximately the same dimensions as the metal card body 610. In one embodiment, the layers of the metal smart card 600 can be disposed such that the sides of the metal card body 610 remain exposed. For example, the non-metal layers may not wrap around the sides of the metal card body 610. The exposed edges of the metal card body 610 can maintain the metal feel and durability of the smart card.

According to an exemplary embodiment, the top overlay layer 604 and the top art layer 603 can be plastic layers, including, but not limited to, polyvinyl chloride (PVC) or polyvinyl chloride acetate (PVCA). The top overlay layer 604 can be approximately 45 μm to approximately 60 μm in thickness. The top art layer 603 can be approximately 127 μm in thickness. In one embodiment, the top overlay layer 604 and the top art layer 603 can be collated before being disposed onto the card. Similarly, the bottom overlay layer 614 and the bottom art layer 614 can be collated before being disposed. In one embodiment, the top polymer layer 602 and the top binder layer 601 can be approximately 50 μm in thickness in combination. In one embodiment, the metal card body 610 can be approximately 330 μm in thickness. The metal card body 610 can include the heavy metal plug (e.g., a tungsten plug) and the antenna as described herein. The bottom binder layer 611 and the bottom polymer layer 612 can be approximately 50 μm to approximately 75 μm in thickness in combination. The bottom art layer 613 can be a PVC layer and can be approximately 127 μm in thickness. The bottom overlay layer 614 can be a PVC layer and can be approximately 45 μm to 60 μm in thickness. In one embodiment, the bottom overlay layer 614 can include a magnetic stripe for swiping the smart card through a reader device such as a payment terminal. It can be appreciated that the dimensions listed herein are presented as exemplary embodiments, and that alternative layer geometries and thicknesses are compatible with the present disclosure.

Figure 6B:
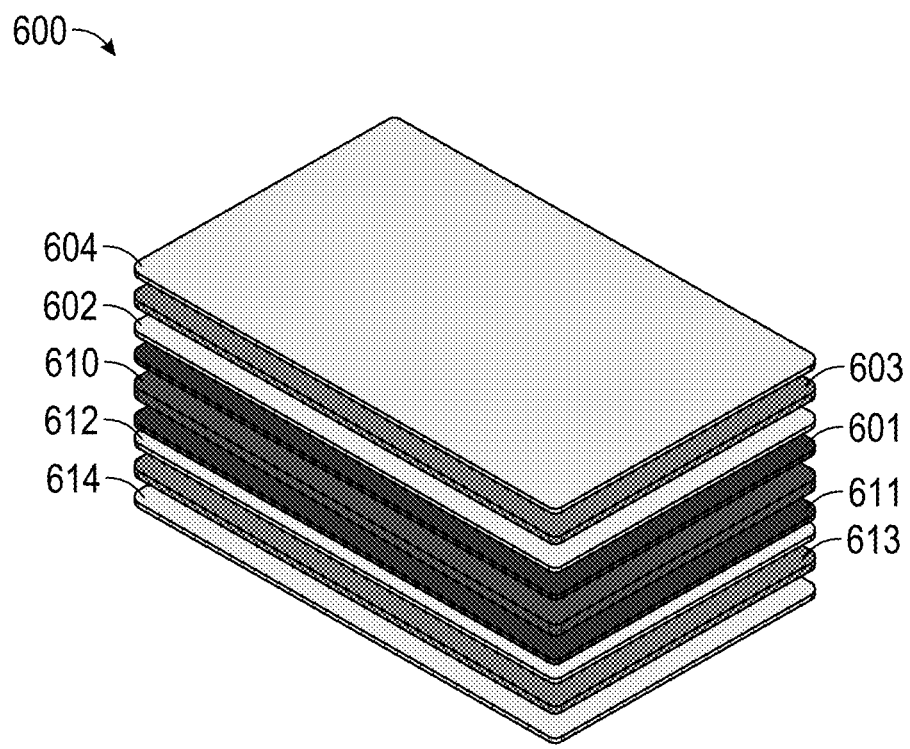
FIG. 6B is an isometric exploded view of a metal smart card, according to an exemplary embodiment of the present disclosure.

FIG. 6B is an isometric exploded view of a fully assembled metal smart card 600 according to an exemplary embodiment of the present disclosure. The metal smart card 600 can include the top overlay layer 604, the top art layer 603, the top polymer layer 602, and the top binder layer 601 as a series of layers stacked on the top surface of the metal card body 610. The metal smart card 600 can further include the bottom binder layer 611, the bottom polymer layer 612, the bottom art layer 613, and the bottom overlay layer 614 as a series of layers stacked beneath the bottom surface of the metal card body 610. According to one embodiment, the metal card body 610 can be the thickest layer of the metal smart card 600. In one embodiment, the art layers and the overlay layers can differ for visual or aesthetic purposes. In one embodiment, the art layers and/or the overlay layers can include etched or raised portions. In one embodiment, at least one of the art layers can include a window, wherein the metal card body can be visible through the window in the art layer. The window can be, for example, a cutout in the art and/or overlay layers. The cutout can be covered with a transparent material such as a transparent plastic or resin. In one embodiment, the window can provide a view of the metal card body and/or the metal plug. The visibility of the metal can provide an aesthetic appeal. The visibility of the metal can also enable a person handling the metal card to see whether there is any corrosion, breakage, or other changes to the inner metal components.

Figure 7:
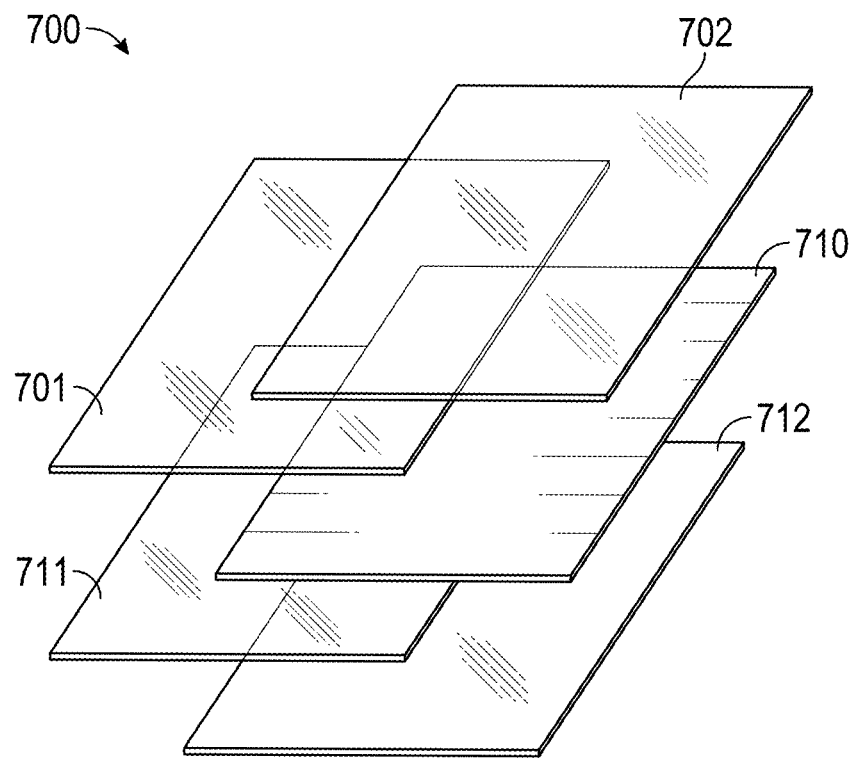
FIG. 7 is an exploded view of a metal inlay, according to an exemplary embodiment of the present disclosure.

In one embodiment, the bottom polymer layer, the bottom binder layer, the metal card body, the top binder layer, and the top polymer layer can be formed as an inlay in the metal smart card. The inlay can be assembled and placed as a single insert. FIG. 7 is an exploded view of an inlay 700 for a single metal smart card according to an exemplary embodiment of the present disclosure. The inlay 700 can include the bottom polymer layer 712, the bottom binder layer 711, the metal card body 710 including the metal plug and the antenna, the top binder layer 701, and the top polymer layer 702. According to one embodiment, each of the polymer layers can be approximately 25 µm in thickness. In one embodiment, the polymer layers can differ in thickness. According to one embodiment, each of the binder layers can be approximately 25 µm in thickness. In one embodiment, the binder layers can differ in thickness.

Figure 8:
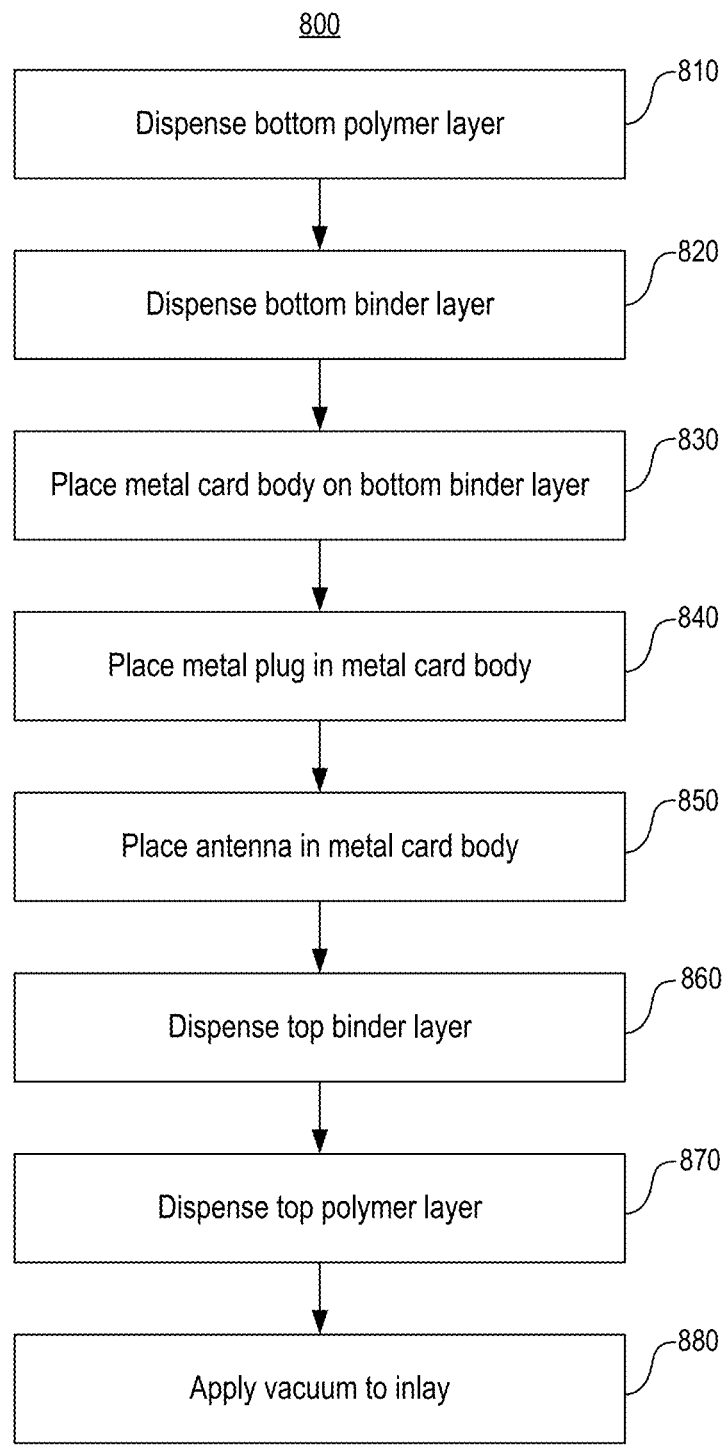
FIG. 8 is a method for assembling a metal inlay, according to an exemplary embodiment of the present disclosure.

FIG. 8 is a method 800 for assembly of an inlay, according to an exemplary embodiment of the present disclosure. The bottom polymer can be provided in step 810. The bottom binder layer can be dispensed on top of the bottom polymer layer in step 820. The metal card body can then be placed on top of the bottom binder layer in step 830. The metal card body can include at least one cavity. In one embodiment, the at least one cavity can be chemically etched in the metal card body. The metal plug can be placed in the at least one cavity in the metal card body in step 840. The metal plug can be cut from a metal sheet or foil using a laser. For example, a tungsten plug can be cut from a sheet of tungsten foil with lasers or with mechanical cutting tools. The antenna can be placed in the at least one cavity in the metal card body in step 850. In one embodiment, the metal plug and the antenna can be placed in the same cavity. The metal plug can fully encapsulate or partially encapsulate the antenna, as has been described herein. In one embodiment, the metal plug can be placed into a first cavity in the metal card body and the antenna can be placed into a second cavity in the metal card body. In one embodiment, the metal plug and the antenna can be placed in the at least one cavity by hand. In one embodiment, the metal plug and the antenna can be placed in the at least one cavity by a pick and place machine. According to one embodiment, the placement of the metal plug and the antenna can be inspected and adjusted before additional layers are dispensed on top of the metal card body. The top binder layer can be dispensed on top of the metal card body in step 860 after the metal plug and antenna have been placed in the metal card body. The top polymer layer can be dispensed on top of the top binder layer in step 870.

In one embodiment, the inlay can be finalized by placing the assembled inlay layers into a vacuum chamber and applying a vacuum in step 880. In the vacuum chamber, a plate (e.g., an acrylic or stainless steel plate) can be placed on top of the layers to apply weight and hold the layers in place while the vacuum is applied to the chamber. As an exemplary method, the plate can be approximately 400 mm by 600 mm and can include 9-30 embedded, 25 mm diameter, 3 mm thick N45 magnets to hold the metal card body in place. The vacuum can embed all materials between the top polymer layer and the bottom polymer layer to reduce errors. According to one embodiment, the vacuum can be applied for approximately 60 to 90 seconds. After the vacuum has embedded all of the materials and layers, the inlay can be handled easily without the individual layers or components shifting. It can be appreciated that the inlays can be assembled as a sheet of inlays, wherein the sheet of inlays can include more than one inlay (e.g., 30 inlays). Each layer in the inlay can be deposited as a sheet. The sheet of inlays can be embedded in the vacuum chamber. In one embodiment, each inlay can be cut into the sheet using a laser cutting or similar process. According to one embodiment, the layers of the inlay can be individually cut, e.g., using laser cutting, prior to or during assembly. The inlays or cards can be separated from the sheet in a singulation process after assembly of the inlay or the entire metal card. Certain card embodiments described herein may provide advantages for assembly. For example, placing the metal plug and the antenna in a single cavity can reduce operator placement time compared to placing components in separate cavities.

Figure 9:
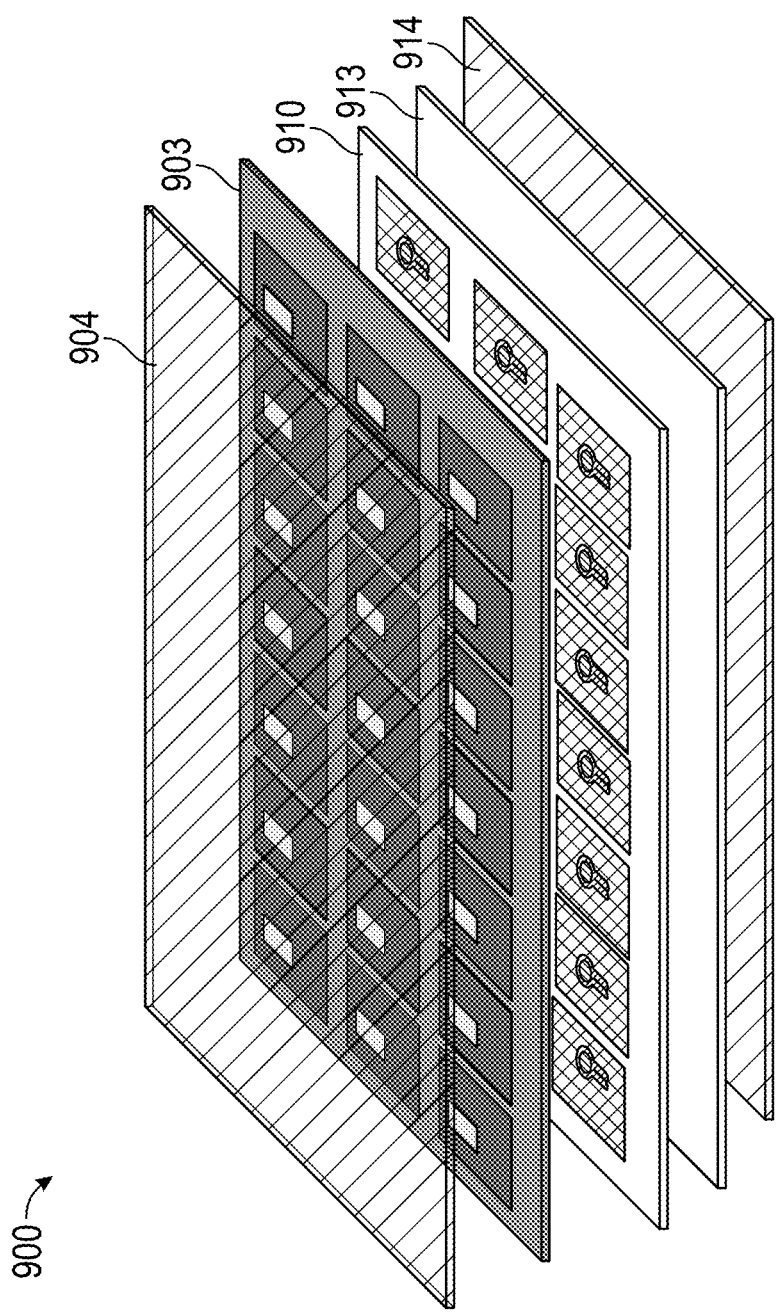
FIG. 9 is an exploded view of a sheet of metal smart cards, according to an exemplary embodiment of the present disclosure.

FIG. 9 is an exploded view of a sheet of metal smart cards 900 according to an exemplary embodiment of the present disclosure. The metal smart cards can be assembled in layered sheets. In one example, a sheet can include 30 metal smart cards. In one embodiment, the polymer layers, binder layers, and metal card bodies can be assembled as a sheet of inlays 910, as described herein with reference to FIG. 7 and FIG. 8. The remaining layers, including the overlay layers and the art layers, can be disposed in sheets surrounding the sheet of inlays. According to one embodiment, the bottom overlay sheet 914 can be approximately 45 µm in thickness. The bottom art sheet 913 can be a printed core sheet and can be approximately 127 µm in thickness. As an example, the art layer can be printed using a silkscreen or similar process. In one embodiment, magnetic strips can be printed on the bottom art sheet 913 using magnetic inks. The inlay sheet 910 can be disposed on top of the bottom art sheet 913. The inlay sheet 910 can include a sheet of metal card bodies surrounded by a top polymer sheet and a top binder sheet and a bottom binder sheet and a bottom polymer sheet. The inlay sheet 910 can be approximately 450 µm in thickness. The top art sheet 903 can be a printed core disposed on top of the inlay sheet 910 and can be approximately 127 µm in thickness. The top art sheet 903 can be printed with the same design as the bottom art sheet 913 or a different design. The top overlay sheet 904 can then be disposed on top of the top art sheet 903 and can be approximately 45 µm in thickness. In one embodiment, the overlay layers can be transparent.

Figure 10:
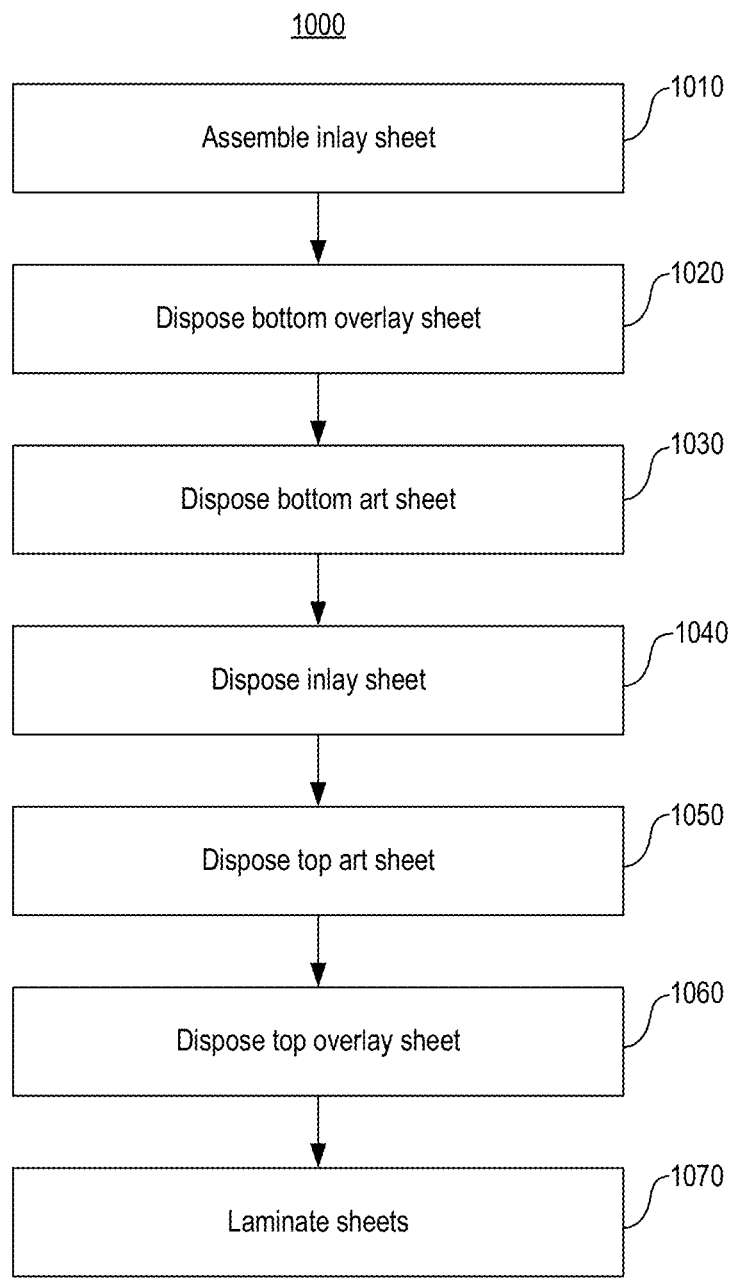
FIG. 10 is a method for assembling a metal smart card, according to an exemplary embodiment of the present disclosure.

FIG. 10 is a method 1000 of assembling a sheet of metal smart cards with heavy metal plugs, according to an exemplary embodiment of the present disclosure. A sheet of inlays can first be assembled in step 1010. The sheet of inlays can be assembled according to the methods described herein with reference to FIG. 8. The bottom overlay sheet can be disposed in step 1020. The bottom art sheet can be printed and can be disposed on top of the bottom overlay sheet in step 1030. The inlay sheet can be disposed on top of the bottom art sheet in step 1040. The top art sheet can be printed and can be disposed on top of the metal inlay sheet in step 1050. The top overlay sheet can be disposed on top of the top art sheet in step 1060. In one embodiment, plastic welding can secure the layers in place while the sheet of cards is being assembled. Plastic sheets can hold the layers together temporarily while the sheets are being disposed in layers. In one embodiment, heat welding can secure the layers in place during assembly. Heat welding can reduce the risk of contaminating the binder layers.

According to some embodiments, the sheet of metal smart cards can be laminated in step 1070 after the sheets are collated. The lamination can hold the layers together and can protect the finish of the card and increase the strength of the card. Advantageously, the collation of the overlay, art, and inlay layers and the lamination of the sheet of cards are not affected by the placement of the metal plugs in the metal card bodies. In one embodiment, the plastic from the plastic welding can be removed after lamination.

In one embodiment, the metal smart cards can be embossed after lamination. In some embodiments, a varnish can be added to both surfaces of the metal smart card after assembly. The varnish can prevent scratching. In one embodiment, the varnish can replace one or more of the layers of the metal smart card for a thinner card. According to some embodiments, the varnish can obscure components or any edges or outlines in the metal smart card. For example, the varnish can obscure the cavity in the metal card body where the metal plug is placed. After the sheet of metal smart cards has been assembled and laminated, the individual assembled metal smart cards can be separated from the sheet in the singulation process. Each metal smart card can include a metal card body, wherein the metal card body includes the heavy metal plug and an antenna. The arrangement of the heavy metal plug and the antenna can be according to any of the embodiments described herein in order to increase the weight of the metal smart card while maintaining an edge-to-edge metal card body that is configured for contact-based or contactless card reading.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system modules and components in the embodiments described above should not be understood as requiring such separation in all embodiments, and it should be understood that the described program components and systems can generally be integrated together in a single component or packaged into multiple components.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals.

(1) An inlay layer of a metal smart card, comprising a metal card body, the metal card body defining at least one cavity, the at least one cavity having a continuous surface defined by an inner surface of the metal card body; a metal plug, the metal plug being housed inside the at least one cavity; and an electronic component, the electronic component being housed inside the at least one cavity.

(2) The inlay layer of (1), wherein the metal card body is composed of a first metal, and wherein the metal plug is composed of a second metal.

(3) The inlay layer of any (1) to (2), wherein a density of the second metal is greater than a density of the first metal.

(4) The inlay layer of any (1) to (3), wherein the metal plug defines a cavity in the metal plug, the cavity having a continuous surface defined by an inner surface of the metal plug.

(5) The inlay layer of any (1) to (4), wherein the electronic component is fully or partially encapsulated by the cavity in the metal plug.

(6) The inlay layer of any (1) to (5), wherein the cavity in the metal plug extends through the top and bottom outer surfaces of the metal plug.

(7) The inlay layer of any (1) to (6), wherein the at least one cavity in the metal card body is a first cavity and a second cavity and wherein the continuous surface of the first cavity is discontinuous with the continuous surface of the second cavity.

(8) The inlay layer of any (1) to (7), wherein the metal plug is disposed inside the first cavity and the electronic component is disposed inside the second cavity.

(9) The inlay layer of any (1) to (8), wherein the continuous surface of the at least one cavity is discontinuous with an edge of the metal card body.

(10) A metal smart card, comprising an inlay layer, the inlay layer comprising a metal card body, the metal card body defining at least one cavity in the metal card body, the at least one cavity having a continuous surface defined by an inner surface of the metal card body; a metal plug, the metal plug being housed inside the at least one cavity; and an electronic component, the electronic component being housed inside the at least one cavity; and a polymer layer disposed on an outer surface of the inlay layer, wherein the polymer layer is in contact with an outer surface of the metal plug.

(11) The metal smart card of (10), wherein the metal card body is composed of a first metal and the metal plug is composed of a second metal.

(12) The metal smart card of any (10) to (11), wherein a density of the second metal is greater than a density of the first metal.

(13) The metal smart card of any (10) to (12), wherein the metal plug defines a cavity in the metal plug, the cavity having a continuous surface defined by an inner surface of the metal plug.

(14) The metal smart card of any (10) to (13), wherein the electronic component is fully or partially encapsulated by the cavity in the metal plug.

(15) The metal smart card of any (10) to (14), wherein the cavity in the metal plug extends through the top and bottom outer surfaces of the metal plug.

(16) The metal smart card of any (10) to (15), wherein the at least one cavity in the metal card body is a first cavity and a second cavity and wherein the continuous surface of the first cavity is discontinuous with the continuous surface of the second cavity.

(17) The metal smart card of any (10) to (16), wherein the metal plug is disposed in the first cavity and the electronic component is disposed in the second cavity.

(18) The metal smart card of any (10) to (17), wherein the continuous surface of the at least one cavity is discontinuous with an edge of the metal card body.

(19) A method for manufacturing a metal smart card inlay, the method comprising forming a metal card body of a first metal; forming at least one cavity in the metal card body, the at least one cavity having a continuous surface defined by an inner surface of the metal card body; forming a metal plug of a second metal; depositing the metal plug in the at least one cavity in the metal card body; and depositing an electronic component in the at least one cavity in the metal card body.

(20) The method of (19), further comprising forming a cavity in the metal plug, the cavity having a continuous surface defined by an inner surface of the metal plug.

(21) The method of any (19) to (20), wherein the electronic component is partially or fully deposited in the cavity in the metal plug.

(22) The method of any (19) to (21), wherein the at least one cavity is a first cavity and a second cavity, wherein the continuous surface of the first cavity is discontinuous with the continuous surface of the second cavity, and wherein the metal plug is deposited in the first cavity and the electronic component is deposited in the second cavity.

(23) The method of any (19) to (22), wherein a density of the second metal is greater than a density of the first metal.

(24) The method of any (19) to (23), wherein the continuous surface of the at least one cavity is discontinuous with an edge of the metal card body.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. An inlay layer of a metal smart card, comprising:
a metal card body, the metal card body defining at least one cavity, the at least one cavity having a continuous surface defined by an inner surface of the metal card body;
a metal plug, the metal plug being housed inside the at least one cavity and contained in the metal card body; and
an electronic component, the electronic component being housed inside the at least one cavity, wherein
the electronic component is in contact with a portion of the continuous surface of the at least one cavity defining an inner perimeter of the at least one cavity, and
an edge of the electronic component is in contact with an edge of the metal plug in the at least one cavity.

2. The inlay layer of claim 1, wherein the metal card body is composed of a first metal, and wherein the metal plug is composed of a second metal.

3. The inlay layer of claim 2, wherein a density of the second metal is greater than a density of the first metal.

4. The inlay layer of claim 1, wherein the continuous surface of the at least one cavity is discontinuous with an edge of the metal card body.

5. The inlay layer of claim 1, wherein the metal plug defines a cavity in the metal plug, the cavity having a continuous surface defined by an inner surface of the metal plug.

6. The inlay layer of claim 5, wherein the electronic component is fully or partially encapsulated by the cavity in the metal plug.

7. The inlay layer of claim 5, wherein the cavity in the metal plug extends through top and bottom outer surfaces of the metal plug.

8. A metal smart card, comprising:
an inlay layer, the inlay layer comprising:
a metal card body, the metal card body defining at least one cavity in the metal card body, the at least one cavity having a continuous surface defined by an inner surface of the metal card body;
a metal plug, the metal plug being housed inside the at least one cavity and contained in the metal card body; and
an electronic component, the electronic component being housed inside the at least one cavity; and
a polymer layer disposed on an outer surface of the inlay layer, wherein the polymer layer is in contact with an outer surface of the metal plug, wherein
the electronic component is in contact with a portion of the continuous surface of the at least one cavity defining an inner perimeter of the at least one cavity, and
an edge of the electronic component is in contact with an edge of the metal plug in the at least one cavity.

9. The metal smart card of claim 8, wherein the metal card body is composed of a first metal and the metal plug is composed of a second metal.

10. The metal smart card of claim 9, wherein a density of the second metal is greater than a density of the first metal.

11. The metal smart card of claim 8, wherein the continuous surface of the at least one cavity is discontinuous with an edge of the metal card body.

12. The metal smart card of claim 8, wherein the metal plug defines a cavity in the metal plug, the cavity having a continuous surface defined by an inner surface of the metal plug.

13. The metal smart card of claim 12, wherein the electronic component is fully or partially encapsulated by the cavity in the metal plug.

14. The metal smart card of claim 12, wherein the cavity in the metal plug extends through top and bottom surfaces of the metal plug.

15. An inlay layer of a metal smart card, comprising:
a metal card body, the metal card body defining a first cavity and a second cavity, the first cavity having a first continuous surface defined by an inner surface of the metal card body and the second cavity having a second continuous surface defined by the inner surface of the metal card body;
a metal plug, the metal plug being housed inside the first cavity and contained in the metal card body; and
an electronic component, the electronic component being housed inside the second cavity, wherein
the first continuous surface of the first cavity is discontinuous with the second continuous surface of the second cavity.

16. The inlay layer of claim 15, wherein the metal card body is composed of a first metal, and wherein the metal plug is composed of a second metal.

17. The inlay layer of claim 16, wherein a density of the second metal is greater than a density of the first metal.

18. The inlay layer of claim 15, wherein the first continuous surface of the first cavity and the second continuous surface of the second cavity are discontinuous with an edge of the metal card body.

19. The inlay layer of claim 15, wherein the second cavity extends from a top surface of the metal card body through a bottom surface of the metal card body.

* * * * *